(12) United States Patent
Li et al.

(10) Patent No.: US 12,401,306 B2
(45) Date of Patent: Aug. 26, 2025

(54) FORWARD AND REVERSE ROTATION CONTROL DEVICE

(71) Applicant: Schneider Electric (China) Co., Ltd., Beijing (CN)

(72) Inventors: Xiaoqiang Li, Beijing (CN); Meng Du, Beijing (CN); Cheng Huang, Beijing (CN); Zhenzhong Liu, Beijing (CN); Shunxian Mao, Beijing (CN); Zhibao Wang, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 175 days.

(21) Appl. No.: 18/521,755

(22) Filed: Nov. 28, 2023

(65) Prior Publication Data

US 2025/0030367 A1    Jan. 23, 2025

(30) Foreign Application Priority Data

Jul. 20, 2023   (CN) .......................... 202310898984.9

(51) Int. Cl.
*H02P 23/24*    (2016.01)
*H02P 25/16*    (2006.01)

(52) U.S. Cl.
CPC .............. *H02P 23/24* (2016.02); *H02P 25/16* (2013.01)

(58) Field of Classification Search
CPC .................................. H02P 23/24; H02P 25/16
See application file for complete search history.

(56) References Cited

U.S. PATENT DOCUMENTS

2021/0159818 A1* 5/2021 Moghe ...................... H02P 1/02
2022/0297279 A1* 9/2022 Abbott .................... B25B 21/00

FOREIGN PATENT DOCUMENTS

CN        206759355 U      12/2017

OTHER PUBLICATIONS

Extended European Search Report dated May 28, 2024 for corresponding European Patent Application No. 1 23213037.7-1002, 10 pages.

* cited by examiner

*Primary Examiner* — Zoheb S Imtiaz
(74) *Attorney, Agent, or Firm* — Troutman Pepper Locke LLP

(57) ABSTRACT

Embodiments of the present disclosure provide a forward and reverse rotation control device for power-using equipment. The forward and reverse rotation control device comprises: a first input member adapted to be electrically connected to a first power supply line; a second input member adapted to be electrically connected to a second power supply line; a first output member and a second output member adapted to be connected to an input end of the power-using equipment; and a moving assembly capable of switching between a first connecting position and a second connecting position, wherein in a case that the moving assembly is in the first connecting position, the moving assembly connects the first input member to the first output member and connects the second input member to the second output member, and in a case that the moving assembly is in the second connecting position, the moving assembly connects the first input member to the second output member and connects the second input member to the first output member.

8 Claims, 4 Drawing Sheets

FORWARD AND REVERSE ROTATION CONTROL DEVICE

FIELD

Embodiments of the present disclosure generally relate to the technical field of electrical equipment, and more specifically, to a forward and reverse rotation control device for power-using equipment.

BACKGROUND

Forward and reverse rotation of a motor is determined by a phase sequence of its windings. Motors are divided into three-phase motors and the like according to their phase composition. For example, there is a three-phase circuit in a three-phase motor, namely A phase, B phase, and C phase. In general, the phase sequence of the windings of the motor is ABC, which causes the motor to rotate in a forward direction. When the motor needs to rotate in a reverse direction, it is necessary to change the phase sequence of windings of the motor to CBA via a forward and reverse rotation control device.

A conventional forward and reverse rotation control device typically includes two contactors. An interlocking module needs to be mounted between the two contactors to avoid the simultaneous conduction of an input member and every output member, resulting in the problem of the conventional forward and reverse rotation control device being too bulky and easily occupying mounting space. In addition, the wiring in the conventional forward and reverse rotation control device is complex.

SUMMARY

A purpose of the present disclosure is to provide a forward and reverse rotation control device to at least partially solve the above problems.

The present disclosure provides a forward and reverse rotation control device for power-using equipment. The forward and reverse rotation control device comprises: a first input member adapted to be electrically connected to a first power supply line; a second input member adapted to be electrically connected to a second power supply line; a first output member and a second output member adapted to be connected to an input end of the power-using equipment; and a moving assembly capable of switching between a first connecting position and a second connecting position, wherein in a case that the moving assembly is in the first connecting position, the moving assembly connects the first input member to the first output member and connects the second input member to the second output member, and in a case that the moving assembly is in the second connecting position, the moving assembly connects the first input member to the second output member and connects the second input member to the first output member.

According to the embodiments of the present disclosure, in a case that the moving assembly is in the first connecting position, the first input member is connected to the first output member, and the second input member is connected to the second output member; while in a case that the moving assembly is in the second connecting position, the first input member is connected to the second output member, and the second input member is connected to the first output member. Therefore, the forward and reverse rotation control device of the embodiments of the present disclosure can change the phase sequence of the windings of the motor by changing the different connecting relationships between the input and output members, thereby controlling the forward and reverse rotation of the motor. Regardless of whether the moving assembly is in the first or second connecting position, each input member is only connected to the corresponding one output member, without the need to install an interlocking module. The forward and reverse rotation control device has a simple structure and does not occupy the mounting space. In addition, due to the first input member being electrically connected to the first power supply line, the second input member being electrically connected to the second power supply line, and the first output member and the second output member being connected to the input end of the power-using equipment, the wiring of the forward and reverse rotation control device of the embodiments of the present disclosure is simple.

In some embodiments, the forward and reverse rotation control device further comprises a third input member and a third output member, wherein the third input member is adapted to be electrically connected to a third power supply line, the third output member is adapted to be connected to the input end of the power-using equipment, and the third input member is connected to the third output member.

In some embodiments, the first input member comprises a first input end and a first connecting part connected to the first input end, the second input member comprises a second input end and a second connecting part connected to the second input end, the first output member comprises a first output end and a third connecting part connected to the first output end, the second output member comprises a second output end and a fourth connecting part connected to the second output end, wherein in a case that the moving assembly is in the first connecting position, the moving assembly connects the first connecting part to the third connecting part and connects the second connecting part to the fourth connecting part, and in a case that the moving assembly is in the second connecting position, the moving assembly connects the first connecting part to the fourth connecting part and connects the second connecting part to the third connecting part.

In some embodiments, the forward and reverse rotation control device further comprises a driving assembly connected to the moving assembly to drive the moving assembly to switch between the first connecting position and the second connecting position.

In some embodiments, the moving assembly comprises a driving shaft and a first mounting part and a second mounting part connected to the driving shaft, and the driving assembly is connected to the driving shaft and capable of driving the driving shaft to move in its axial direction, to enable the first mounting part and the second mounting part to move together with the driving shaft.

In some embodiments, the first mounting part is provided with a first conducting member and a second conducting member, the second mounting part is provided with a third conducting member and a fourth conducting member, and along the axial direction of the driving shaft, a first end of the first conducting member is arranged in correspondence to a first end of the first connecting part and a second end of the first conducting member is arranged in correspondence to a first end of the third connecting part, a first end of the second conducting member is arranged in correspondence to a first end of the fourth connecting part and a second end of the second conducting member is arranged in correspondence to a first end of the second connecting part, a first end of the third conducting member is arranged in correspondence to a second end of the first connecting part and a second end of the third conducting member is arranged in correspondence to a second end of the fourth connecting part, a first end of the fourth conducting member is arranged in correspondence to a second end of the third connecting part and a second end of the fourth conducting member is arranged in correspondence to a second end of the second connecting part.

In some embodiments, in a case that the moving assembly is in the first connecting position, the first conducting member connects the first connecting part to the third connecting part, and the second conducting member connects the second connecting part to the fourth connecting part, and in a case that the moving assembly is in the second connecting position, the third conducting member connects the first connecting part to the fourth connecting part, and the fourth conducting member connects the second connecting part to the third connecting part.

In some embodiments, the first mounting part is provided with a first mounting hole and a second mounting hole, the second mounting part is provided with a third mounting hole and a fourth mounting hole, the first conducting member is arranged within the first mounting hole, the second conducting member is arranged within the second mounting hole, the third conducting member is arranged within the third mounting hole, and the fourth conducting member is arranged within the fourth mounting hole.

In some embodiments, along the axial direction of the driving shaft, the driving assembly is located between the first mounting part and the second mounting part, and a first elastic member is arranged within the first mounting hole, an end of the first elastic member is connected to an inner wall surface of the first mounting hole, the other end of the first elastic member is arranged at a side of the first conducting member away from the driving assembly, and the first conducting member is movable within the first mounting hole to press the first elastic member.

In some embodiments, the driving assembly comprises one of a bistable permanent magnet mechanism, an electric push rod, a hydraulic push rod, and an electromagnetic push rod.

In some embodiments, the forward and reverse rotation control device further comprises a first housing and a sensor, wherein the sensor is arranged inside or outside the first housing to detect a position of the driving shaft, wherein in a case that the sensor is arranged outside the first housing, the driving shaft passes through the first housing.

It should be understood that the content described in this section is not intended to limit critical or important features of the embodiments of the present disclosure, nor is it used to limit the scope of the present disclosure. Other features of the present disclosure will become easier to be understood through the following description.

BRIEF DESCRIPTION OF THE DRAWINGS

The above and other features, advantages, and aspects of each embodiment of the present disclosure will become more apparent in conjunction with the accompanying drawings and with reference to the following detailed explanations. In the accompanying drawings, the same or similar reference symbols represent the same or similar elements, where.

DESCRIPTION OF THE REFERENCE SYMBOLS

Figure 1:
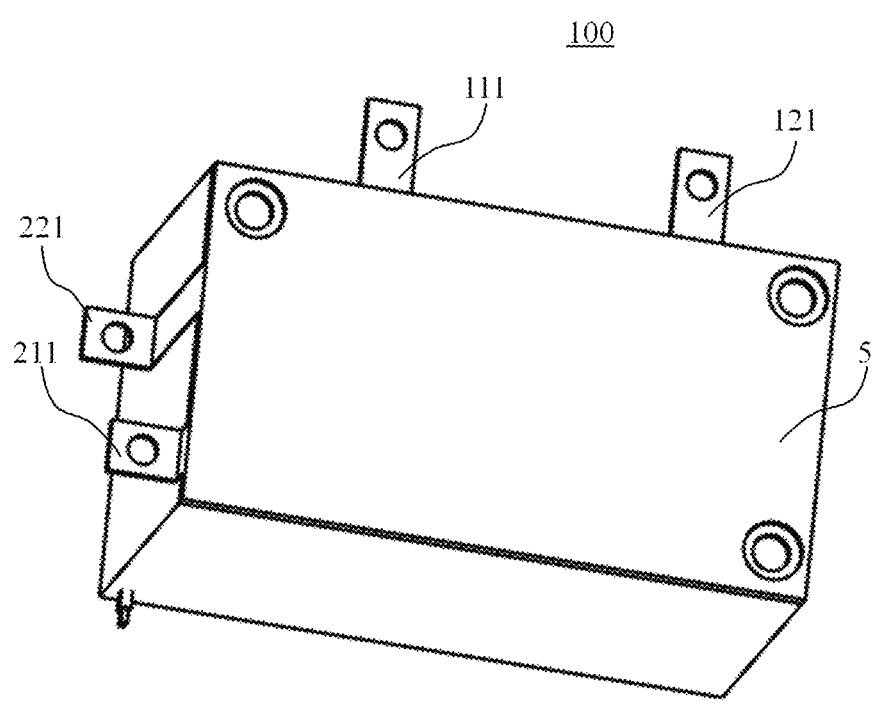
FIG. 1 shows a structural schematic diagram of a forward and reverse rotation control device according to some embodiments of the present disclosure.

100 represents a forward and reverse rotation control device;

11 represents a first input member, 111 represents a first input end, 112 represents a first connecting part, 12 represents a second input member, 121 represents a second input end, 122 represents a second connecting part;

21 represents a first output member, 211 represents a first output end, 212 represents a third connecting part, 22 represents a second output member, 221 represents a second output end, 222 represents a fourth connecting part;

3 represents a moving assembly, 31 represents a driving shaft, 32 represents a first mounting part, 321 represents a first conducting member, 322 represents a second conducting member, 323 represents a first mounting hole, 324 represents a first elastic member, 325 represents a second mounting hole, 326 represents a second elastic member, 33 represents a second mounting part, 331 represents a third conducting member, 332 represents a fourth conducting member, 333 represents a third mounting hole, 334 represents a third elastic member, 335 represents a fourth mounting hole, 336 represents a fourth elastic member;

4 represents a driving assembly, 41 represents a second housing, 42 represents a coil, 43 represents a moving iron core, 44 represents a first magnetizer, 45 represents a second magnetizer, 46 represents a permanent magnet, 47 represents a motion space;

5 represents a first housing.

DETAILED DESCRIPTION

Preferred embodiments of the present disclosure will be described in more detail below with reference to the accompanying drawings. Although the preferred embodiments of the present disclosure are shown in the accompanying drawings, it is to be understood that the present disclosure may be implemented in various forms and should not be limited by the embodiments described here. On the contrary, these embodiments are provided to make the present disclosure more thorough and complete, and to fully convey the scope of the present disclosure to those skilled in the art.

The term "comprise" and its variants used herein indicate open inclusion, that is, "including but not limited to". Unless otherwise stated, the term "or" should be interpreted as "and/or". The term "based on" should be interpreted as "based at least in part on". The terms "an exemplary embodiment" and "an embodiment" should be interpreted as "at least one exemplary embodiment". The term "another embodiment" should be interpreted as "at least one other embodiment". The terms "first", "second", and so on may refer to different or identical objects.

As described above, an interlocking module needs to be mounted to avoid the simultaneous conduction of the input member and every output member during adjustment of the forward and reverse rotation of the motor by the conventional forward and reverse rotation control device, resulting in the problem of occupying the mounting space and complex wiring. Embodiments of the present disclosure provide a forward and reverse rotation control device 100, which can change the phase sequence of the windings of the motor by changing different connecting relationships between the input and output members, thereby controlling the forward and reverse rotation of the motor. Regardless of whether the moving assembly is in the first or second connecting position, each input member is only conductive with the corresponding output member, without the need for an interlocking module. The forward and reverse rotation control device 100 has a simple structure and does not occupy mounting space. In addition, due to the input member being connected to a power supply line and the output member being connected to an input end of the power-using equipment, the forward and reverse rotation control device 100 of the embodiments of the present disclosure is simple in wiring. Hereafter, principles of the present disclosure will be described in conjunction with FIGS. 1-6.

Figure 2:
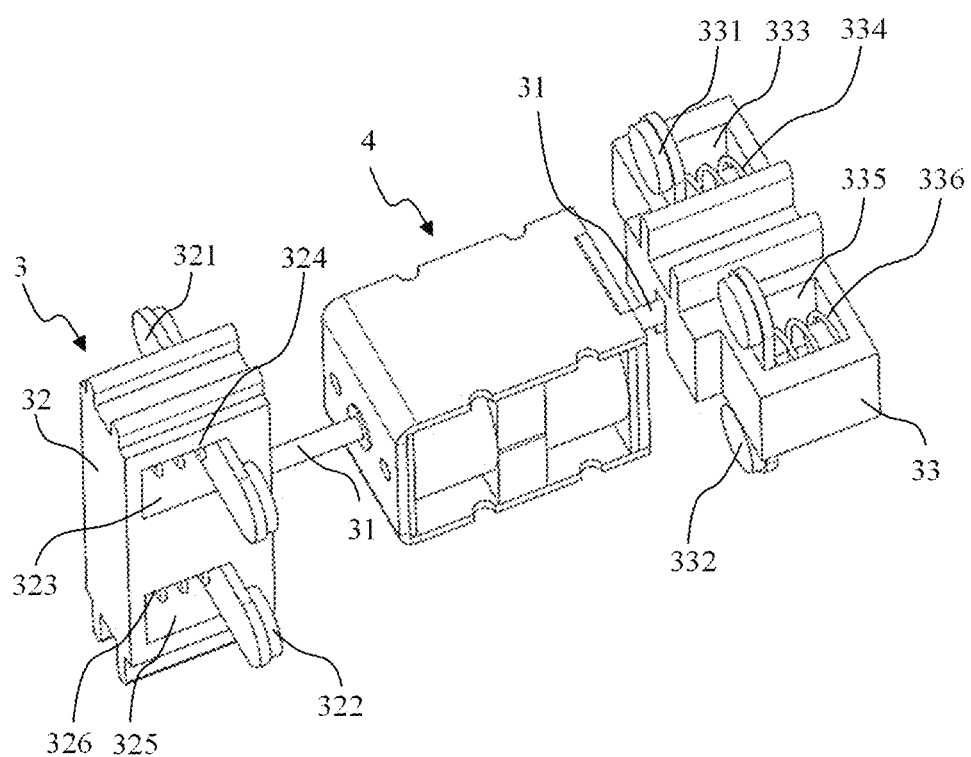
FIG. 2 shows a structural schematic diagram of a moving assembly and a driving assembly according to some embodiments of the present disclosure.
Figure 3:
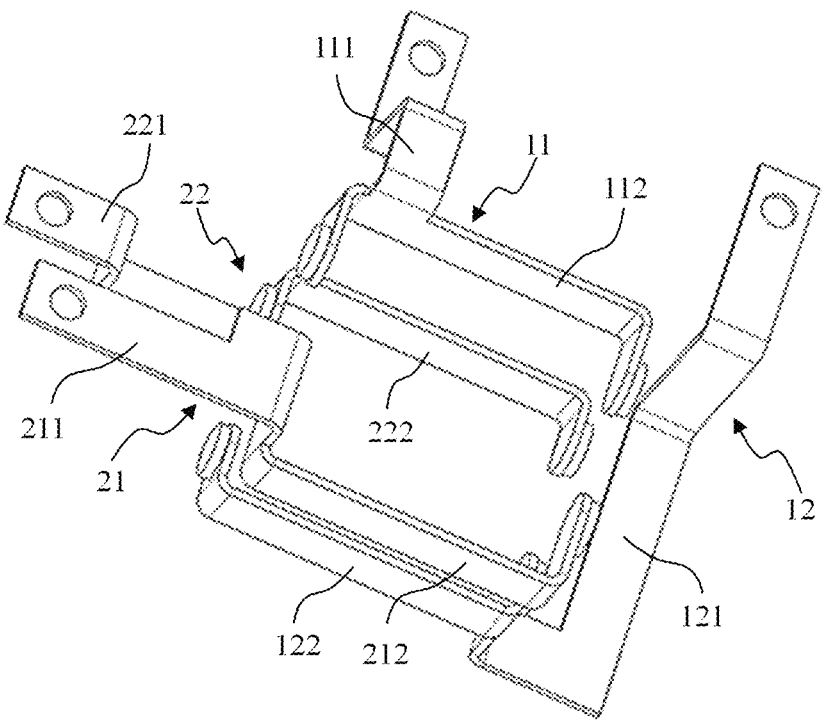
FIG. 3 shows a structural schematic diagram of input and output members according to some embodiments of the present disclosure.

FIG. 1 shows a structural schematic diagram of a forward and reverse rotation control device 100 according to some embodiments of the present disclosure. FIG. 2 shows a structural schematic diagram of a moving assembly 3 and a driving assembly 4 according to some embodiments of the present disclosure. FIG. 3 shows a structural schematic diagram of input and output members according to some embodiments of the present disclosure. As shown in FIGS. 1-3, the forward and reverse rotation control device 100 described herein generally includes a first housing 5, a first input member 11, a second input member 12, a first output member 21, a second output member 22, a moving assembly 3, and a driving assembly 4. The first housing 5 serves as a mounting carrier for arranging the first input member 11, the second input member 12, the first output member 21, the second output member 22, the moving assembly 3, and the driving assembly 4.

As shown in FIG. 1, in some embodiments, the first input member 11 is connected to a first power supply line, and the second input member 12 is connected to a second power supply line. The first output member 21 and the second output member 22 are respectively connected to input ends of the power-using equipment. By utilizing the above configuration, the forward and reverse rotation control device 100 of the embodiments of the present disclosure has simple wiring.

It should be understood that the forward and reverse rotation control device 100 of the embodiments of the present disclosure is suitable for various types of motors. For example, in other embodiments, when the number of the input and output members is three, that is, when the input members include the first input member 11, the second input member 12, and a third input member (not shown in the figure) and the output members include the first output member 21, the second output member 22, and a third output member (not shown in the figure), the forward and reverse rotation control device 100 is suitable for a three-phase motor. In this application scenario, the third input member is electrically connected to a third power supply line, the third output member is connected to the input end of the power-using equipment, and the third input member is always connected to the third output member. Hereafter, the scenario where the forward and reverse rotation control device 100 is applicable to two phases in the three-phase motor will be mainly described. The same applies to other situations and will not be discussed separately hereafter.

It is to be noted that the forward and reverse rotation control device 100 may change the phase sequence of the windings of the motor by changing the connecting relationship between two sets of input members (the first input member 11 and the second input member 12) and output members (the first output member 21 and the second output member 22), without the need of changing the connecting relationship between all three sets of input members and output members.

In some embodiments, the third input member and the third output member may pass through the first housing 5 and form a whole with the first housing 5. In other embodiments, the third input member and the third output member may also be separated from the first housing 5 without passing through it.

As shown in FIG. 2, in some embodiments, the moving assembly 3 may be switched between a first connecting position and a second connecting position to change the connecting relationship between the first and second input members 11, 12 and the first and second output members 21, 22. When the moving assembly 3 is in the first connecting position, the moving assembly 3 connects the first input member 11 to the first output member 21 and connects the second input member 12 to the second output member 22. In a case that the moving assembly 3 is in the second connecting position, the moving assembly 3 connects the first input member 11 to the second output member 22 and connects the second input member 12 to the first output member 21. With the above configuration, the forward and reverse rotation control device 100 of the embodiments of the present disclosure may change the phase sequence of the windings of the motor by changing the different connecting relationships between the input and output members, thereby controlling the forward and reverse rotation of the motor. Regardless of whether the moving assembly is in the first connecting position or the second connecting position, each input member is only conductive with the corresponding output member, without the need of installing an interlocking module. The forward and reverse rotation control device 100 has a simple structure and does not occupy mounting space.

Continuing to refer to FIG. 2, in some embodiments, the moving assembly 3 includes a driving shaft 31 and a first mounting part 32 and a second mounting part 33 connected to the driving shaft 31. The driving assembly 4 is connected to the driving shaft 31 and may drive the driving shaft 31 to move in its axial direction, so that the first mounting part 32 and the second mounting part 33 may move together with the driving shaft 31, thereby enabling the moving assembly 3 to switch between the first connecting position and the second connecting position.

As shown in FIG. 3, in some embodiments, the first input member 11 includes a first input end 111 and a first connecting part 112 connected to the first input end 111. The first input end 111 is electrically connected to the first power supply line. The second input member 12 includes a second input end 121 and a second connecting part 122 connected to the second input end 121. The second input end 121 is electrically connected to the second power supply line. The first output member 21 includes a first output end 211 and a third connecting part 212 connected to the first output end 211. The first output end 211 is adapted to be connected to the input end of the power-using equipment. The second output member 22 includes a second output end 221 and a fourth connecting part 222 connected to the second output end 221. The second output end 221 is adapted to be connected to the input end of the power-using equipment. Similarly, the third input member includes a third input end and a fifth connecting part connected to the third input end. The third input end is electrically connected to the third power supply line. The third output member includes a third output end and a sixth connecting part connected to the third output end. The third output end is adapted to be connected to the input end of the power-using equipment.

Continuing to refer to FIG. 3, it is to be noted that the position relationship between the input and output members may be changed as needed, as long as it may be ensured that the first input member 11 is connected to the first output member 21 and the second input member 12 is connected to the second output member 22 when the moving assembly 3 is in the first connecting position, and the moving assembly 3 connects the first input member 11 to the second output member 22 and connects the second input member 12 to the first output member 21 when the moving assembly 3 is in the second connecting position.

Continuing to refer to FIGS. 2-3, in a case that the moving assembly 3 is in the first connecting position, the moving assembly 3 connects the first connecting part 112 to the third connecting part 212 and connects the second connecting part 122 to the fourth connecting part 222. In a case that the moving assembly 3 is in the second connecting position, the moving assembly 3 connects the first connecting part 112 to the fourth connecting part 222 and connects the second connecting part 122 to the third connecting part 212.

Figure 4:
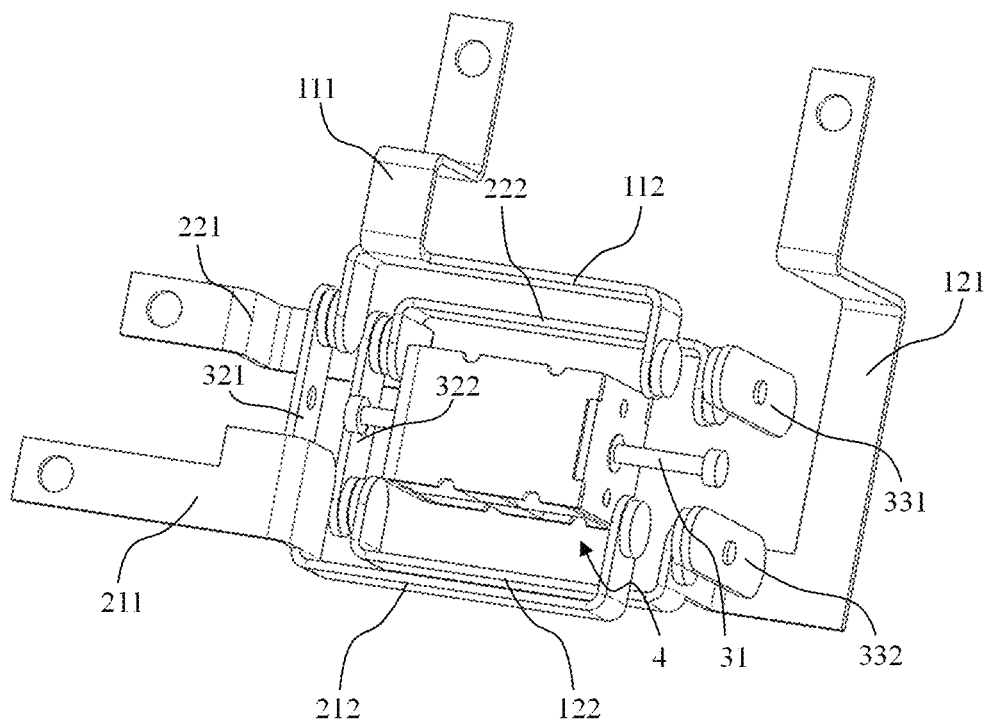
FIG. 4 shows a structural schematic diagram of input members, output members, a driving assembly, and a portion of a moving assembly according to some embodiments of the present disclosure, wherein the moving assembly is in a first connecting position and first and second mounting parts of the moving assembly are not shown.
Figure 5:
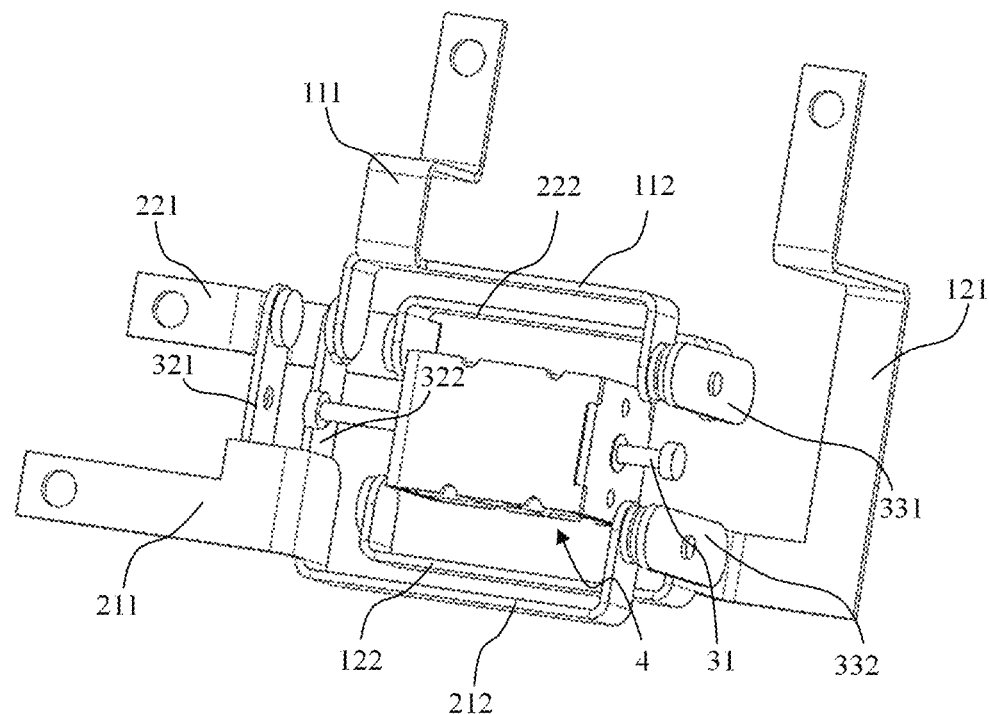
FIG. 5 shows a structural schematic diagram of an input member, an output member, a driving assembly, and a portion of a moving assembly according to some embodiments of the present disclosure, wherein the moving assembly is in a second connecting position and the first and second mounting parts of the moving assembly are not shown.

In some embodiments, FIG. 4 shows a structural schematic diagram of the input members, the output members, the driving assembly 4, and a portion of the moving assembly 3 according to some embodiments of the present disclosure, wherein the moving assembly 3 is in the first connecting position and the first mounting part 32 and the second mounting part 33 of the moving assembly 3 are not shown. FIG. 5 shows a structural schematic diagram of input members, output members, the driving assembly 4, and a portion of the moving assembly 3 according to some embodiments of the present disclosure, wherein the moving assembly is in a second connecting position and the first mounting part 32 and the second mounting part 33 of the moving assembly 3 are not shown. The first mounting part 32 and the second mounting part 33 of the moving assembly 3 are not shown in FIGS. 4-5, so as to avoid obstructing the input and output members, and to better show the connecting relationship between the moving assembly 3 and the input and output members, respectively. As shown in FIGS. 2-5, the first mounting part 32 is provided with a first conducting member 321 and a second conducting member 322, and the second mounting part 33 is provided with a third conducting member 331 and a fourth conducting member 332. Along the axial direction of the driving shaft 31, a first end of the first conducting member 321 is arranged in correspondence to a first end of the first connecting part 112, and a second end of the first conducting member 321 is arranged in correspondence to a first end of the third connecting part 212. A first end of the second conducting member 322 is arranged in correspondence to a first end of the fourth connecting part 222, and a second end of the second conducting member 322 is arranged in correspondence to a first end of the second connecting part 122. A first end of the third conducting member 331 is arranged in correspondence to a second end of the first connecting part 112, and a second end of the third conducting member 331 is arranged in correspondence to a second end of the fourth connecting part 222. A first end of the fourth conducting member 332 is arranged in correspondence to a second end of the third connecting part 212, and a second end of the fourth conducting member 332 is arranged in correspondence to a second end of the second connecting part 122.

With the above configuration, on the one hand, as shown in FIG. 4, along the axial direction of the driving shaft 31, in a case that the moving assembly 3 is in the first connecting position, the first end of the first conducting member 321 is connected to the first end of the first connecting part 112, and the second end of the first conducting member 321 is connected to the first end of the third connecting part 212. The first end of the second conducting member 322 is connected to the first end of the fourth connecting part 222, and the second end of the second conducting member 322 is connected to the first end of the second connecting part 122. The first end of the third conducting member 331 is spaced apart from the second end of the first connecting part 112, and the second end of the third conducting member 331 is spaced apart from the second end of the fourth connecting part 222. The first end of the fourth conducting member 332 is spaced apart from the second end of the third connecting part 212, and the second end of the fourth conducting member 332 is spaced apart from the second end of the second connecting part 122. Therefore, the first conducting member 321 connects the first connecting part 112 to the third connecting part 212, and the first input end 111, the first connecting part 112, the first conducting member 321, the third connecting part 212, and the first output end 211 form a conductive path, that is, the first input member 11 is connected to the first output member 21. In addition, the second conducting member 322 connects the second connecting part 122 to the fourth connecting part 222, and the second input end 121, the second connecting part 122, the second conducting member 322, the fourth connecting part 222, and the second output end 221 form a conductive path, that is, the second input member 12 is connected to the second output member 22.

On the other hand, as shown in FIG. 5, along the axial direction of the driving shaft 31, in a case that the moving assembly 3 is in the second connecting position, the first end of the first conducting member 321 is spaced apart from the first end of the first connecting part 112, and the second end of the first conducting member 321 is spaced apart from the first end of the third connecting part 212. The first end of the second conducting member 322 is spaced apart from the first end of the fourth connecting part 222, and the second end of the second conducting member 322 is spaced apart from the first end of the second connecting part 122. The first end of the third conducting member 331 is connected to the second end of the first connecting part 112, and the second end of the third conducting member 331 is connected to the second end of the fourth connecting part 222. The first end of the fourth conducting member 332 is connected to the second end of the third connecting part 212, and the second end of the fourth conducting member 332 is connected to the second end of the second connecting part 122. Therefore, the third conducting member 331 connects the first connecting part 112 to the fourth connecting part 222, and the first input end 111, the first connecting part 112, the third conducting member 331, the fourth connecting part 222, and the second output end 221 form a conductive path, that is, the first input member 11 is connected to the second output member 22. In addition, the fourth conducting member 332 connects the second connecting part 122 to the third connecting part 212, and the second input end 121, the second connecting part 122, the fourth conducting member 332, the third connecting part 212, and the first output end 211 form a conductive path, that is, the second input member 12 is connected to the first output member 21.

It is to be noted that the first input member 11, the second input member 12, the first output member 21, and the second output member 22 are not limited to the structure as shown in FIG. 3. Other structural features are also possible, as long as it may ensure that, in a case that the moving assembly 3 is in the first and second connecting positions, the connecting relationship between the first and second input members 11, 12 and the first and second output members 21, 22 meets the connecting relationship of the structure as shown in FIG. 3.

In view of the above, embodiments of the present disclosure change the connecting relationship between the first and second input members 11, 12 and the first and second output members 21, 22 by changing the different positions of the moving assembly 3, thereby changing the phase sequence of the windings of the motor and ultimately achieving the requirements of controlling the forward and reverse rotation of the motor.

Continuing to refer to FIGS. 2-5, in some embodiments, end faces of the first and second ends of the first conducting member 321 facing towards the first input member 11 are provided with first contacts. End faces of the first and second ends of the second conducting member 322 facing towards the first input member 11 are provided with first contacts. End faces of the first and second ends of the third conducting member 331 facing towards the first input member 11 are provided with first contacts. End faces of the first and second ends of the fourth conducting member 332 facing towards the first input member 11 are provided with first contacts. Similarly, the first and second ends of the first input member 11, the second input member 12, the first output member 21, and the second output member 22 are also provided with second contacts that are matched with the corresponding first contacts to ensure that they meet a tight fitting requirement when in contact with each other.

Returning to FIG. 2, in some embodiments, the first mounting part 32 is provided with a first mounting hole 323 and a second mounting hole 325. The second mounting part 33 is provided with a third mounting hole 333 and a fourth mounting hole 335. The first conducting member 321 is arranged in the first mounting hole 323. The second conducting member 322 is arranged in the second mounting hole 325. The third conducting member 331 is arranged in the third mounting hole 333. The fourth conducting member 332 is arranged in the fourth mounting hole 335.

In some embodiments, along the axial direction of the driving shaft 31, in a case that the driving assembly 4 is located between the first mounting part 32 and the second mounting part 33, a first elastic member 324 is arranged within the first mounting hole 323. An end of the first elastic member 324 is connected to an inner wall surface of the first mounting hole 323, and the other end of the first elastic member 324 is arranged at a side of the first conducting member 321 away from the driving assembly 4. With the above configuration and continuing to refer to FIG. 4, in a case that the moving assembly 3 moves along the axial direction of the driving shaft 31, the first conducting member 321 happens to contact the first connecting part 112 and the third connecting part 212 at a certain intermediate state during the movement process. At this time, the moving assembly 3 continues to move along the axial direction of the driving shaft 31, and the first conducting member 321 may move in the first mounting hole 323 and press the first elastic member 324. A reaction force of the first elastic member 324 causes the first conducting member 321 to come into closer contact with the first connecting part 112 and the third connecting part 212. Similarly, a second elastic member 326 is arranged within the second mounting hole 325. An end of the second elastic member 326 is connected to an inner wall surface of the second mounting hole 325, and the other end of the second elastic member 326 is arranged at a side of the second conducting member 322 away from the driving assembly 4. A third elastic member 334 is arranged within the third mounting hole 333. An end of the third elastic member 334 is connected to an inner wall surface of the third mounting hole 333, and the other end of the third elastic member 334 is arranged at a side of the third conducting member 331 away from the driving assembly 4. A fourth elastic member 336 is arranged within the fourth mounting hole 335. An end of the fourth elastic element 336 is connected to an inner wall surface of the fourth mounting hole 335, and the other end of the fourth elastic element 336 is arranged at a side of the fourth conducting member 332 away from the driving assembly 4. The second elastic member 326, the third elastic member 334, and the fourth elastic member 336 may achieve similar effects as the first elastic member 324, all of which ensure the tight fitting requirement between the conducting members and the connecting parts, which will not be described in detail here.

Specifically, the forward and reverse rotation control device 100 also includes a sensor (not shown in the figures), which may be mounted inside or outside the first housing 5. The sensor is used to detect the position of the driving shaft 31. That is to say, the sensor may detect that the moving assembly 3 is in the first and second connecting positions, and a controller connected to the sensor may then determine whether the moving assembly 3 is in the first or second connecting position.

In some embodiments, the sensor is arranged outside the first housing 5. In a case that the sensor is arranged outside the first housing 5, the driving shaft 31 passes through the first housing 5. As shown in FIG. 1, in other embodiments, the sensor is arranged inside the first housing 5.

In some embodiments, the driving assembly 4 is connected to the moving assembly 3. The driving assembly 4 may drive the moving assembly 3 to switch between the first and second connecting positions, thereby controlling the forward and reverse rotation of the motor. The driving assembly 4 according to the embodiments of the present disclosure may be various types of driving assemblies that are currently known or available in the future, as long as they may drive the moving assembly 3 to move. Embodiments of the present disclosure are not intended to be limited in this respect. For example, in some embodiments, the driving assembly 4 may include a bistable permanent magnet mechanism. In some embodiments, the driving assembly 4 may also include a dual coil permanent magnet mechanism, an electric push rod, a hydraulic push rod, or an electromagnetic push rod. Hereafter, the working principle will be mainly described in the scenario of the driving assembly 4 including the bistable permanent magnet mechanism. Other situations will not be described in detail hereafter.

It is to be noted that in a case that the driving assembly 4 includes the bistable permanent magnet mechanism, the driving assembly 4 is located between the first mounting part 32 and the second mounting part 33. In a case that the driving assembly 4 includes the electric push rod, the hydraulic push rod, or the electromagnetic push rod, the driving assembly 4 is located at an end of the first mounting part 32 away from the second mounting part 33, or at an end of the second mounting part 33 away from the first mounting part 32.

Figure 6:
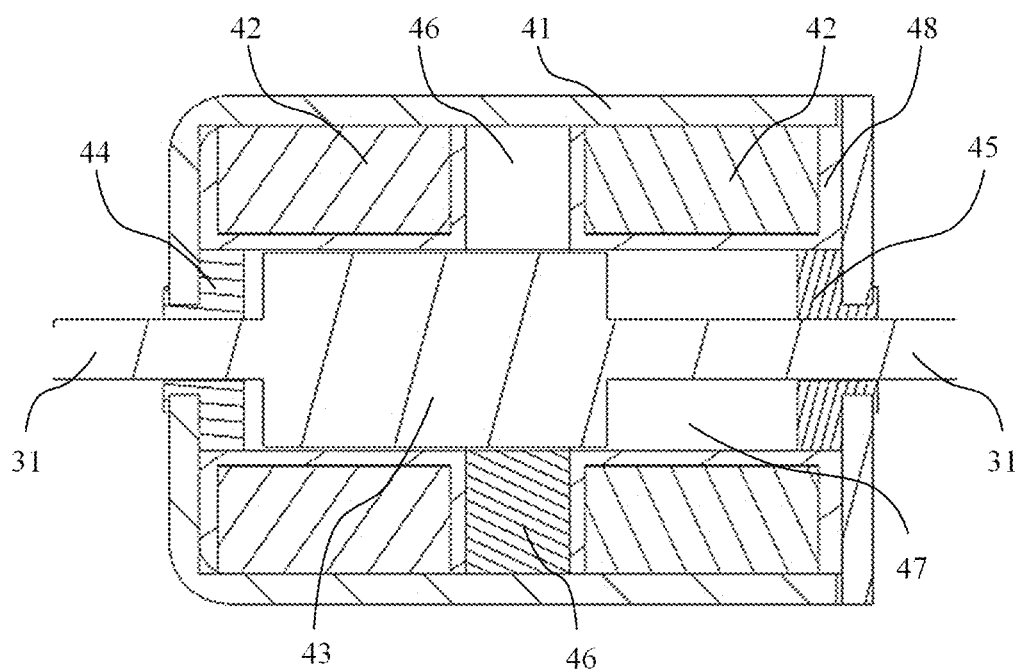
FIG. 6 shows a cross-sectional view of the driving assembly and a driving shaft according to some embodiments of the present disclosure.

In some embodiments, FIG. 6 shows a cross-sectional view of the driving assembly 4 and the driving shaft 31 according to some embodiments of the present disclosure. As shown in FIG. 6, the driving assembly 4 includes a bistable permanent magnet mechanism. The bistable permanent magnet mechanism is located between the first mounting part 32 and the second mounting part 33.

Continuing to refer to FIG. 6, in some embodiments, the bistable permanent magnet mechanism includes a second housing 41, a coil 42, a moving iron core 43, a first magnetizer 44, a second magnetizer 45, a support frame 48, and two permanent magnets 46. The coil 42, the moving iron core 43, the first magnetizer 44, the second magnetizer 45, the permanent magnets 46, and the support frame 48 are all located inside the second housing 41. The coil 42 and the permanent magnets 46 are both arranged inside the support frame 48. The permanent magnets 46 are arranged in the middle position of the coil 42, and a circular channel for the movement of the moving iron core 43 is arranged inside the support frame 48. Along the axial direction of the circular channel, the first magnetizer 44 is arranged at an end of the circular channel, the second magnetizer 45 is arranged at the other end of the circular channel, and the moving iron core 43 is located between the first magnetizer 44 and the second magnetizer 45, so that the support frame 48, the first magnetizer 44, and the second magnetizer 45 together form a motion space 47, thereby enabling the moving iron core 43 to move within the motion space 47.

It is to be noted that numbers, numerical values, etc. mentioned above and elsewhere in the present disclosure are exemplary and are not intended to limit the scope of the present disclosure in any way. Any other appropriate numbers or numerical values are possible. The permanent magnets 46 may also include two or more magnets, for example, in a case that the permanent magnets 46 includes three magnets, one permanent magnet 46 is arranged at a side of the moving iron core 43, and two permanent magnets 46 are arranged at the other side. In a case that the permanent magnets 46 includes more than three magnets, the arrangement manner of the permanent magnets 46 is similar and will not be repeated here. In addition, magnetic poles of adjacent ends of the permanent magnets 46 at both sides should be the same.

With the above configuration, as shown in FIG. 6, when the moving iron core 43 is adjacent/attached to the left side of the motion space 47, the permanent magnets 46, the first magnetizer 44, the second housing 41, and the moving iron core 43 form a first magnetic loop. A magnetic force generated by the first magnetic loop of the permanent magnets 46 causes the moving iron core 43 to be adjacent/attached to the first magnetizer 44 and to be held in this position. In a case that it is necessary to move the moving iron core 43 in the bistable permanent magnet mechanism rightwards along the motion space 47, a current in a certain direction is applied to the coil 42. The direction of the electromagnetic field generated by the current through the coil 42 is opposite to the direction of the magnetic field generated by the permanent magnets 46 in a position where the moving iron core 43 is adjacent/attached to the first conductor 44, so as to counteract the magnetic field generated by the permanent magnets 46 and generate a rightward electromagnetic force on the moving iron core 43. The combined action of the electromagnetic force and the elastic member on the moving assembly 3 drives the moving iron core 43 to move rightwards. In a case that the moving iron core 43 moves close to the second magnetizer 45, the permanent magnets 46, the second magnetizer 45, the second housing 41, and the moving iron core 43 form a second magnetic loop. As a gap between the moving iron core 43 and the second magnetizer 45 decreases, the electromagnetic force exerted by the coil 42 on the moving iron core 43 and the magnetic force exerted by the second magnetic loop of the permanent magnets 46 on the moving iron core 43 increase, causing the moving iron core 43 to move rightwards at an increased speed and reach a position adjacent/attached to the second magnetizer 45. In a case that the current is stopped from being applied to the coil 42, the permanent magnets 46 maintain the moving iron core 43 in a position adjacent/attached to the second magnetizer 45. Similarly, in a case that it is necessary to move the moving iron core 43 in the bistable permanent magnet mechanism leftwards along the motion space 47, a reverse current may be applied to the coil 42, which will not be described in detail here. It may be understood that on the one hand, the position movement of the moving iron core 43 may be achieved through the bistable permanent magnet mechanism, thereby achieving the switching of the moving assembly 3 between the first connecting position and the second connecting position. On the other hand, in a case that the bistable permanent magnet mechanism stops applying current to the coil 42, the position of the moving iron core 43 at both ends may be maintained by the permanent magnets 46, without the need for continuous power supply, thereby reducing the use cost.

In some embodiments, the driving shaft 31 may be made of magnetic conductive materials, such as the same material as the moving iron core 43. In other embodiments, the driving shaft 31 may also be made of non-magnetic conductive materials, and the embodiments of the present disclosure are not intended to be limited in this respect.

In some embodiments, the number of the driving shaft 31 is one, and the driving shaft 31 passes through the moving iron core 43, while also passing through the second housing 41, the first magnetizer 44, and the second magnetizer 45. The driving shaft 31 may be integrally formed with the moving iron core 43 and may also be the same member as the moving iron core 43. In other embodiments, the number of the driving shafts 31 is two, and along the axial direction of the circular channel, the driving shafts 31 are respectively arranged at both ends of the moving iron core 43. The arrangement manner of the driving shafts 31 includes but is not limited to welding and connecting through connectors. The driving shaft 31 located at an end of the moving iron core 43 passes through the second housing 41 and the first magnetizer 44, and the driving shaft 31 located at the other end of the moving iron core 43 passes through the second housing 41 and the second magnetizer 45. With the above two configurations, the moving iron core 43 may drive the driving shafts 31 to move while moving within the motion space 47.

The forward and reverse rotation control device 100 according to the embodiments of the present disclosure may be applied to various motors, such as three-phase motors. It should be understood that the forward and reverse rotation control device 100 according to the embodiments of the present disclosure may also be applied to other power-using equipment, and the embodiments of the present disclosure are not intended to be limited in this respect.

Various embodiments of the present disclosure have been described above, which are exemplary, not exhaustive, and are not limited to the disclosed embodiments. Without deviating from the scope and spirit of the various embodiments explained, many modifications and changes are apparent for those skilled in the art. The selection of terms used herein is intended to best explain the principles, practical applications, or technological improvements in the market of each embodiment, or to enable those skilled in the art to understand the disclosed embodiments.

What is claimed is:

1. A forward and reverse rotation control device for power-using equipment, comprising: a first input member adapted to be electrically connected to a first power supply line; a second input member adapted to be electrically connected to a second power supply line; a first output member and a second output member adapted to be connected to an input end of the power-using equipment; and a moving assembly capable of switching between a first connecting position and a second connecting position, wherein in a case that the moving assembly is in the first connecting position, the moving assembly connects the first input member to the first output member and connects the second input member to the second output member, and in a case that the moving assembly is in the second connecting position, the moving assembly connects the first input member to the second output member and connects the second input member to the first output member; wherein the first input member comprises a first input end and a first connecting part connected to the first input end, the second input member comprises a second input end and a second connecting part connected to the second input end, the first output member comprises a first output end and a third connecting part connected to the first output end, the second output member comprises a second output end and a fourth connecting part connected to the second output end, wherein in a case that the moving assembly is in the first connecting position, the moving assembly connects the first connecting part to the third connecting part and connects the second connecting part to the fourth connecting part, and in a case that the moving assembly is in the second connecting position, the moving assembly connects the first connecting part to the fourth connecting part and connects the second connecting part to the third connecting part; wherein the forward and reverse rotation control device further comprises a driving assembly connected to the moving assembly to drive the moving assembly to switch between the first connecting position and the second connecting position; wherein the moving assembly comprises a driving shaft and a first mounting part and a second mounting part connected to the driving shaft, and the driving assembly is connected to the driving shaft and capable of driving the driving shaft to move in its axial direction, to enable the first mounting part and the second mounting part to move together with the driving shaft.

2. The forward and reverse rotation control device according to claim 1, wherein the forward and reverse rotation control device further comprises a third input member and a third output member, wherein the third input member is adapted to be electrically connected to a third power supply line, the third output member is adapted to be connected to the input end of the power-using equipment, and the third input member is connected to the third output member.

3. The forward and reverse rotation control device according to claim 1, wherein the first mounting part is provided with a first conducting member and a second conducting member, the second mounting part is provided with a third conducting member and a fourth conducting member, and along the axial direction of the driving shaft, a first end of the first conducting member is arranged in correspondence to a first end of the first connecting part and a second end of the first conducting member is arranged in correspondence to a first end of the third connecting part, a first end of the second conducting member is arranged in correspondence to a first end of the fourth connecting part and a second end of the second conducting member is arranged in correspondence to a first end of the second connecting part, a first end of the third conducting member is arranged in correspondence to a second end of the first connecting part and a second end of the third conducting member is arranged in correspondence to a second end of the fourth connecting part, a first end of the fourth conducting member is arranged in correspondence to a second end of the third connecting part and a second end of the fourth conducting member is arranged in correspondence to a second end of the second connecting part.

4. The forward and reverse rotation control device according to claim 3, wherein, in a case that the moving assembly is in the first connecting position, the first conducting member connects the first connecting part to the third connecting part, and the second conducting member connects the second connecting part to the fourth connecting part, and in a case that the moving assembly is in the second connecting position, the third conducting member connects the first connecting part to the fourth connecting part, and the fourth conducting member connects the second connecting part to the third connecting part.

5. The forward and reverse rotation control device according to claim 3, wherein the first mounting part is provided with a first mounting hole and a second mounting hole, the second mounting part is provided with a third mounting hole and a fourth mounting hole, the first conducting member is arranged within the first mounting hole, the second conducting member is arranged within the second mounting hole, the third conducting member is arranged within the third mounting hole, and the fourth conducting member is arranged within the fourth mounting hole.

6. The forward and reverse rotation control device according to claim 5, wherein, along the axial direction of the driving shaft, the driving assembly is located between the first mounting part and the second mounting part, and a first elastic member is arranged within the first mounting hole, an end of the first elastic member is connected to an inner wall surface of the first mounting hole, the other end of the first elastic member is arranged at a side of the first conducting member away from the driving assembly, and the first conducting member is movable within the first mounting hole to press the first elastic member.

7. The forward and reverse rotation control device according to claim 1, wherein the driving assembly comprises one of a bistable permanent magnet mechanism, an electric push rod, a hydraulic push rod, and an electromagnetic push rod.

8. The forward and reverse rotation control device according to claim 1, wherein the forward and reverse rotation control device further comprises a first housing and a sensor, wherein the sensor is arranged inside or outside the first housing to detect a position of the driving shaft, wherein in a case that the sensor is arranged outside the first housing, the driving shaft passes through the first housing.

* * * * *